United States Patent [19]

Ishii et al.

[11] Patent Number: 5,956,684

[45] Date of Patent: Sep. 21, 1999

[54] VOICE RECOGNITION APPARATUS, VOICE RECOGNITION METHOD, MAP DISPLAYING APPARATUS, MAP DISPLAYING METHOD, NAVIGATION APPARATUS, NAVIGATION METHOD AND CAR

[75] Inventors: Kazuo Ishii, Kanagawa; Eiji Yamamoto, Saitama; Miyuki Tanaka, Tokyo; Hiroshi Kakuda; Yasuharu Asano, both of Kanagawa; Hiroaki Ogawa, Tokyo; Masanori Omote, Kanagawa; Katsuki Minamino, Tokyo, all of Japan

[73] Assignee: Sony Corporation, Tokyo, Japan

[21] Appl. No.: 08/728,910

[22] Filed: Oct. 11, 1996

[30] Foreign Application Priority Data

Oct. 16, 1995 [JP] Japan ................. P07-267543

[51] Int. Cl.⁶ ..................................... G10L 5/02
[52] U.S. Cl. .................. 704/275; 704/274; 704/270; 704/246
[58] Field of Search .................. 704/270, 275, 704/277; 701/200–201

[56] References Cited

U.S. PATENT DOCUMENTS

| | | | |
|---|---|---|---|
| 5,177,685 | 1/1993 | Davis et al. ................. | 701/200 |
| 5,274,560 | 12/1993 | LaRue ...................... | 701/202 |
| 5,297,183 | 3/1994 | Bareis et al. ............... | 455/410 |
| 5,659,597 | 8/1997 | Bareis ...................... | 455/563 |

FOREIGN PATENT DOCUMENTS

| | | |
|---|---|---|
| 0488733 | 11/1991 | European Pat. Off. . |
| 0675341 | 3/1995 | European Pat. Off. . |
| 03175478 | of 1991 | Japan ............... G09B 29/10 |
| 06274190 | of 1994 | Japan ............... G10L 3/00 |

OTHER PUBLICATIONS

Patent Abstracts of Japan No. JP 07–064480 (Yoshiyuki).
IBM Technical Disclosure Bulletin "Data Retrieval through a Compact Disk Device having a Speech–Driven Interface" vol. 38, No. 01, pp. 267–267, Jan. 1995.
Patent Abstracts of Japan No. JP 07–021200 (Masahito).

*Primary Examiner*—David R. Hudspeth
*Assistant Examiner*—Michael N. Opsanick
*Attorney, Agent, or Firm*—Jay H. Maioli

[57] ABSTRACT

Voice processing for recognizing a predetermined voice such as a place name is performed by a voice processing section 14 from an audio signal inputted from a microphone 11 on the basis of an operation of a talk switch 18. When a map display is based on the recognized place name is performed, an incorrect reading and a place name commonly mistaken can be also recognized. Accordingly, a high grade operation of a navigation apparatus can be simply performed without obstructing an operator driving while a car.

14 Claims, 9 Drawing Sheets

FIG. 4

| Urban And Rural Prefectures | Cities, Wards, Towns And Villages Names | Phonemic Model |
|---|---|---|
| Hokkaido | Akibira City<br>Asahikawa City<br>⋮ | |
| Aomori Pref. | Aomori city<br>⋮ | |
| Kanagawa Pref. | Ohiso-Machi<br>Ohiso-Cho | |
| Kanagawa Pref. | Kawasaki City | |
| Tokyo Metropolis | Kawasaki City | |

⋮

| What Time<br>Present Time | Now<br>Time | |
|---|---|---|

FIG. 5

| Entry | Operation | Character Code Data for Responsive Voice | Latitude Longitude Data | Character Code Data for Display |
|---|---|---|---|---|
| Ohiso-Machi, Kanagawa Pref. | Map Display | Ohiso-Machi, Kanagawa Pref. | 139.18, 35.18 | Ohiso-Machi, Kanagawa Pref. |
| Ohiso-Cho, Kanagawa Pref. | Map Display | Ohiso-Machi, Kanagawa Pref. | 139.18, 35.18 | Ohiso-Machi, Kanagawa Pref. |
| Kawasaki City, Kanagawa Pref. | Map Display | Kawasaki City, Kanagawa Pref. | 139.42, 35.31 | Kawasaki City, Kanagawa Pref. |
| Kawasaki City, Tokyo Metropolis | Map Display | Kawasaki City, Kanagawa Pref. | 139.42, 35.31 | Kawasaki City, Kanagawa Pref. |
| What Time Now | Response of Time | It is ○○ o'clock, ○○ minute. | — | — |
| Present Time | Response of Time | It is ○○ o'clock, ○○ minute. | — | — |
| Time | Response of Time | It is ○○ o'clock, ○○ minute. | — | — |

FIG. 6

| Entry | Operation | Character Code Data for Responsive Code | Latitude Longitude Data | Character Code Data for Display |
|---|---|---|---|---|
| Kawasaki City, Kanagawa Pref. | Map Display | Kawasaki City, Kanagawa Pref. | 139.42, 35.31 | Kawasaki City, Kanagawa Pref. |
| Kawasaki City, Kanagawa Pref. | Map Display | Kawasaki City, Kanagawa Pref. | 139.42, 35.31 | Kawasaki City, Kanagawa Pref. |

VOICE RECOGNITION APPARATUS, VOICE RECOGNITION METHOD, MAP DISPLAYING APPARATUS, MAP DISPLAYING METHOD, NAVIGATION APPARATUS, NAVIGATION METHOD AND CAR

BACKGROUND OF THE INVENTION

1. Field of the Invention

The present invention relates to a voice recognition apparatus and a voice recognition method suitably applied to a navigation apparatus mounted to e.g., a car and displaying a road map, etc., the navigation apparatus and a navigation method combined with this voice recognition apparatus, and a car mounting these apparatuses thereon.

2. Description of the Prior Art

Various kinds of navigation apparatuses mounted onto a car, etc. have been developed. Each of these navigation apparatuses is constructed by a large capacity data memory means such as a CD-ROM storing e.g., road map data, a detecting means for detecting the present position of the car, and a displaying apparatus for displaying a road map in the vicinity of the detected present position on the basis of data read from the data memory means. In this case, the detecting means of the present position is constructed by using a position measuring system using an artificial satellite for a position measurement called a GPS (Global Positioning System), a self-contained navigation following up a change in the present position from a starting spot point on the basis of information such as a vehicle's running direction, a vehicle's running speed, etc.

A map displayed in the displaying apparatus is set such that a map in a desirable position can be displayed as well as the present position by performing a key operation, etc. as long as map data are prepared.

In the case of such a navigation apparatus, for example, in the case of the navigation apparatus for a car, the displaying apparatus is generally arranged in the vicinity of a driver seat such that a driver can see a map in the vicinity of the present position while the car is running and temporarily stops as in traffic signal stoppage, etc.

It is necessary to be able to operate such a navigation apparatus such that no navigation apparatus obstructs driving of the car, etc. For example, the navigation apparatus is constructed such that a complicated operation of the navigation apparatus is inhibited during the car driving. Namely, when such a navigation apparatus is arranged in a vehicle, the navigation apparatus is connected to a certain running state detecting section (e.g., a parking brake switch of the car). The navigation apparatus is set such that all operations of the navigation apparatus can be performed only when stoppage of the vehicle is detected by this running state detecting section, and a complicated key operation is inhibited in a nonstopping state (namely, during running of the vehicle).

However, it is inconvenient that no operation for switching display maps, etc. can be performed during such running. Accordingly, it is required that a high grade operation of the navigation apparatus can be performed without obstructing the driving of the vehicle even when the vehicle is running.

SUMMARY OF THE INVENTION

In consideration of such problem points, an object of the present invention is to be able to simply perform high grade operations of various kinds of apparatuses such as a navigation apparatus, etc. without obstructing the driving of a car, etc.

BRIEF DESCRIPTION OF THE DRAWINGS

FIG. 4 is an explanatory view showing a memory area construction of a memory for voice recognition in one embodiment.

FIG. 5 is an explanatory view showing a memory area construction of a memory for longitude and latitude conversion in one embodiment.

FIG. 5A is a view showing an application example of the present invention.

FIG. 6 is a flow chart showing processing by voice recognition in one embodiment.

DESCRIPTION OF THE PREFERRED EMBODIMENTS

One embodiment of the present invention will next be described with reference to the accompanying drawings.

Figure 1:
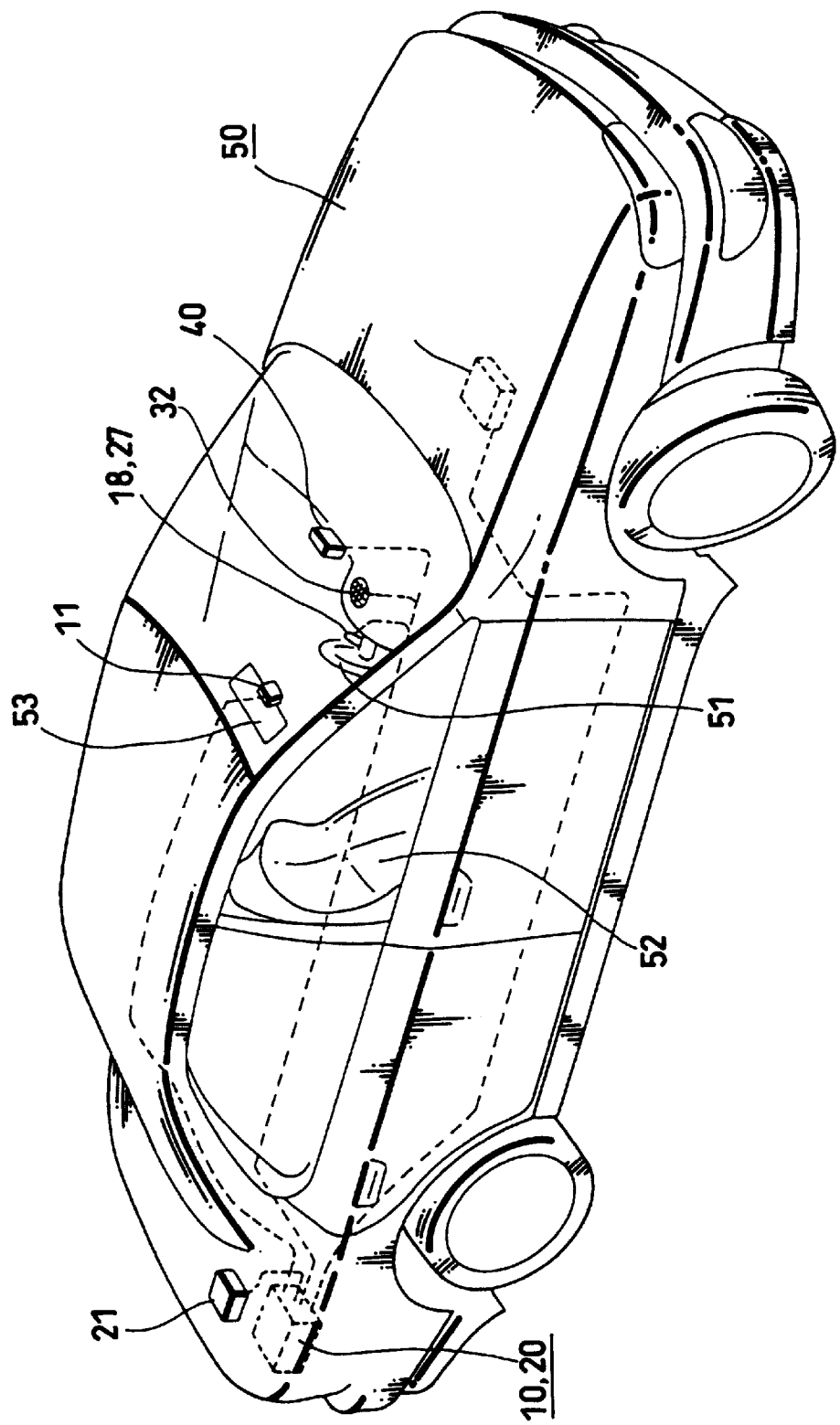
FIG. 1 is a perspective view showing a state in which an apparatus in one embodiment of the present invention is assembled into a car.

In this example, the present invention is applied to a navigation apparatus mounted to a car. An arranging state of the navigation apparatus mounted to the car in this example will first be explained with reference to FIGS. 1 and 2. As shown in FIG. 1, a handle 51 of the car 50 is attached to a front portion of a driver seat 52 and a driver sitting on the driver seat 52 basically operates the navigation apparatus. However, there is also a case in which another fellow passenger within this car 50 operates the navigation apparatus. A body 20 of this navigation apparatus and a voice recognition apparatus 10 connected to this navigation apparatus body 20 are arranged in an arbitrary space (e.g., within a trunk of a rear portion) within the car 50. An antenna 21 for receiving a position measuring signal described later is attached onto the outer side of a car body (otherwise, within the car such as the inner side of a rear window, etc.).

Figure 2:
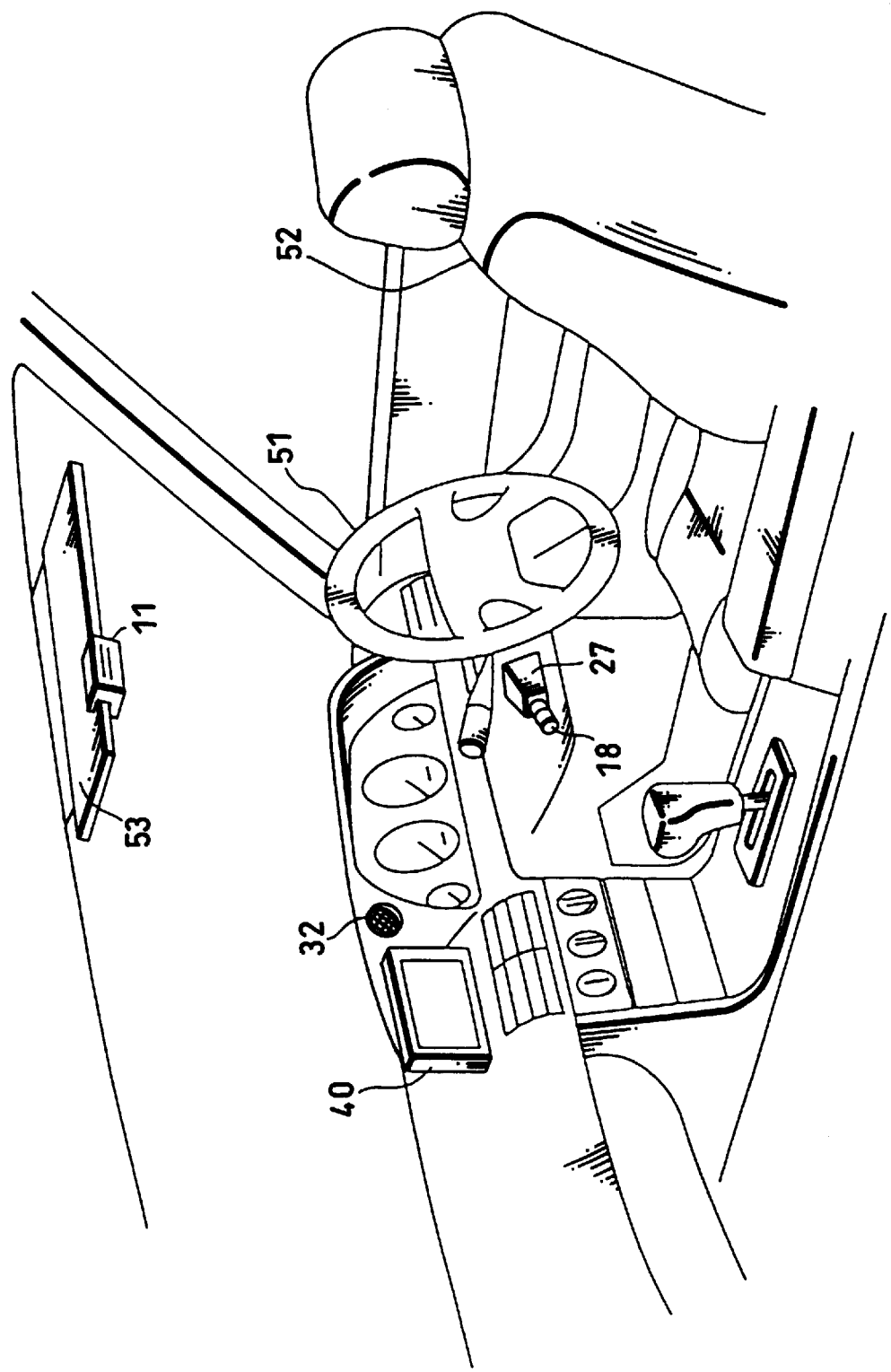
FIG. 2 is a perspective view showing a portion near a driver seat when the apparatus in one embodiment is assembled into the car.

As shown in the vicinity of the driver seat in FIG. 2, a talk switch 18 and an operation key 27 of the navigation apparatus described later are arranged on a side of the handle 51 such that the talk switch 18 and the operation key 27 are operated without causing any obstruction during driving of the car. A displaying apparatus 40 connected to the navigation apparatus is also arranged in a position in which no field of view in front of the driver is obstructed. A speaker 32 for outputting an audio signal synthesized as a voice within the navigation apparatus 20 is attached to the car in a position in which an output voice reaches the driver (e.g., on a side of the displaying apparatus 40, etc.).

A voice can be inputted to the navigation apparatus in this example. Therefore, a microphone 11 is attached to a sun visor 53 arranged in an upper portion of a front glass in front of the driver seat 52 so that the microphone 11 collects a speaking voice of the driver sitting on the driver seat 52.

The navigation apparatus body 20 in this example is connected to a computer 54 for controlling the operation of an engine of this car so that a pulse signal proportional to a car speed is supplied from this computer 54 to the navigation apparatus body 20.

Figure 3:
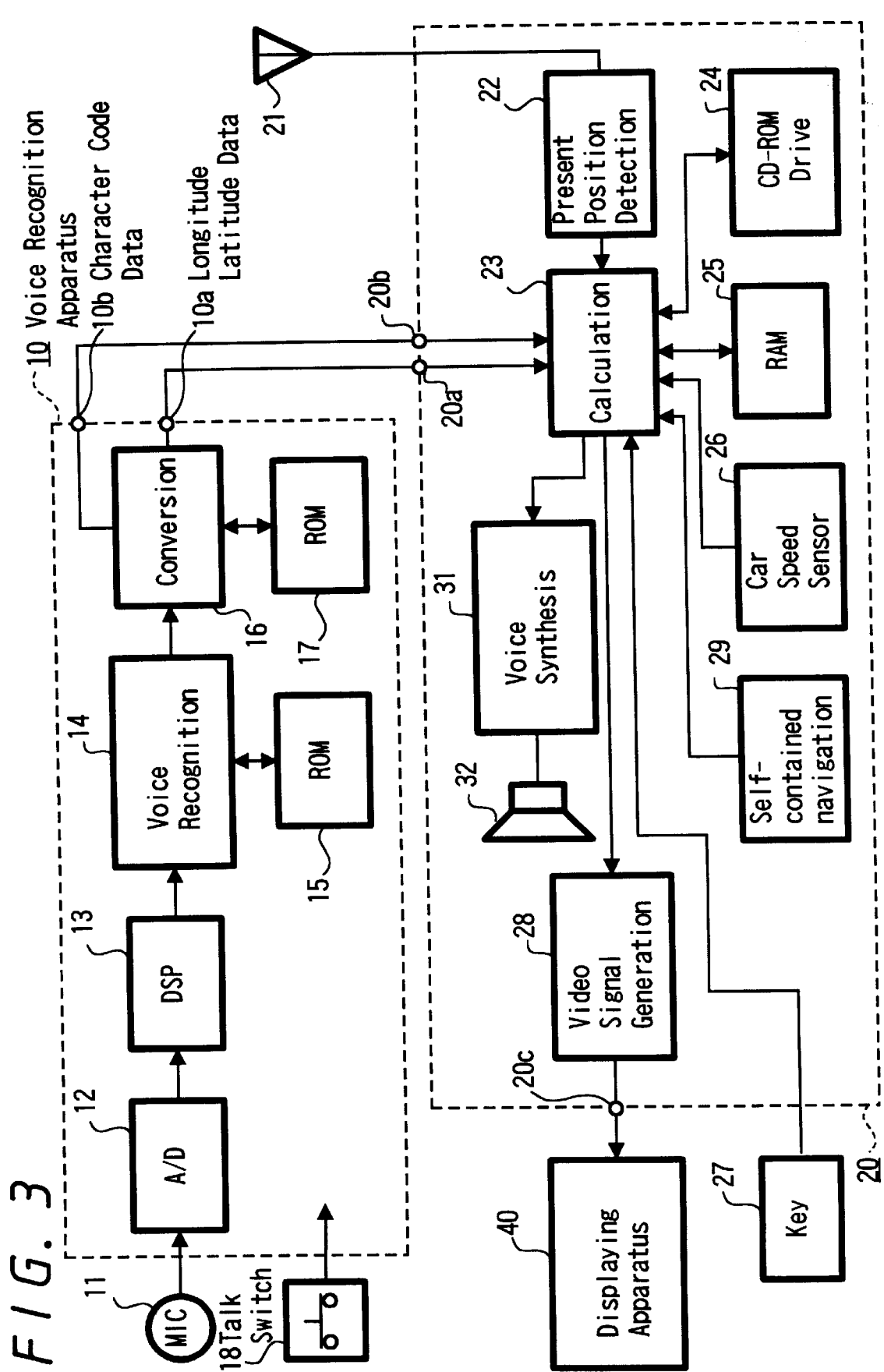
FIG. 3 is a constructional view showing one embodiment of the present invention.

An internal construction of the navigation apparatus in this example will next be explained with reference to FIG. 3. In this example, the voice recognition apparatus 10 is connected to the navigation apparatus 20 and the microphone 11 is connected to the voice recognition apparatus 10. For example, directivity of this microphone 11 is set to be relatively narrow and the microphone 11 is constructed such that only a speaking voice of a person sitting on the driver seat of the car is preferably collected.

An audio signal collected by this microphone 11 is supplied to an analog/digital converter 12 and is sampled by a signal of a predetermined sampling frequency and is converted to a digital audio signal. Then, the digital audio signal outputted from this analog/digital converter 12 is supplied to a digital voice processing circuit 13 constructed by an integrated circuit called a DSP (digital signal processor). In this digital voice processing circuit 13, the digital voice signal is set to vector data by processings such as band division, filtering, etc., and these vector data are supplied to a voice recognition circuit 14.

A ROM 15 for storing voice recognition data is connected to this voice recognition circuit 14 so that a recognizing operation is performed in accordance with a predetermined voice recognizing algorithm (e.g., HMM: Hidden Markov model) with respect to the vector data supplied from the digital voice processing circuit 13. This ROM 15 then selects plural candidates from phonemic models for voice recognition stored to the ROM 15 and reads character data stored in accordance with a phonemic model having a highest conformity degree among these candidates.

Here, a data storing state of the ROM 15 for storing voice recognizing data in this example will be explained. In the case of this example, only the name of a place and a word for designating an operation of the navigation apparatus are recognized. As shown in a setting state of a memory area in FIG. 4, only the names of domestic urban and rural prefectures, cities, wards, towns and villages are registered as the name of a place. A character code of this place name and a phonemic model as data for recognizing the place name as a voice are stored to the memory area for each of the urban and rural prefectures, cities, wards, towns and villages.

For example, in the case of the interior of the country of Japan, the number of cities, wards, towns and villages in the whole country is about 3500 so that about 3500 place names are stored to the memory area. However, in the case of the place name of "xx town", both data showing the pronouncing case of "xx machi" and data showing the pronouncing case of "xx cho" are stored. Similarly, in the case of the place name of "xx village", both data showing the pronouncing case of "xx son" and data showing the pronouncing case of "xx mura" are stored.

The names of urban and rural prefectures tending to be mistaken are additionally registered with respect to the names of cities, wards, towns and villages having a high possibility that the names of urban and rural prefectures are incorrectly remembered such as cities, wards, towns and villages, etc. adjacent to boundaries of the urban and rural prefectures in position. Namely, for example, "Kawasaki city, Kanagawa prefecture" is registered and "Kawasaki city, Tokyo Metropolis" providing an adjacent name of each of the urban and rural prefectures is also registered.

Character codes of words for giving commands of various kinds of operations such as words designating display positions such as "destination", "starting spot", "routing spot", "one's own house", etc., "what time now" (a command for hearing the present time), "where now" (a command for hearing the present position), "next" (a command for hearing the next intersection), "how far from here" (a command for hearing a distance until the destination), "speed" (a command for hearing the present speed), "altitude" (a command for hearing the present altitude), "advancing direction" (a command for hearing an advancing direction), "list" (a command for displaying a list of recognizable commands in the displaying apparatus), etc., and others are stored as words for designating the operation of the navigation apparatus. Further, a phonemic model corresponding to each of these words is also stored. With respect to the command for hearing the present time, character codes and phonemic models corresponding to other words such as "present time", "time", etc., in addition to "what time now" mentioned above are stored. The present time command is responded even when the command is given by any voice.

When a character code corresponding to a phonemic model and conforming to recognized results obtained through a predetermined voice recognizing algorithm from input vector data is the character code of a place name in the voice recognition circuit 14, this character code is read from the ROM 15. This read character code is supplied to a converting circuit 16. A ROM 17 for storing converted data is connected to this converting circuit 16. Longitude and latitude data corresponding to the character data supplied from the voice recognition circuit 14 and their accompanying data are read from the ROM 17.

Here, a data storing state of the ROM 17 for storing converted data in this example will be explained. In the case of this example, a memory area is set for every character code of the same pronunciation as the character code of a place name stored to the ROM 15 for storing voice recognizing data. As shown in FIG. 5, an apparatus operation in a recognizing case of this word, the character code of a responsive voice, longitude and latitude data of a region in a case in which the voice shows a place name of this region, and data displayed as characters (a character code using Chinese characters, etc.) are stored for every character code.

In the case of this example, as mentioned above, in the case of the names of towns and villages, voices can be recognized in both the pronouncing cases of "xx machi" and "xx mura" and the pronouncing cases of "xx cho" and "xx son". However, as shown in FIG. 5, a responsive voice stored to the ROM 17 is set to data for outputting the voice of a correct pronunciation with respect to any recognized voice.

When the names of urban and rural prefectures tending to be mistaken is provided and registered with respect to the names of cities, wards, towns and villages having a high probability that the names of urban and rural prefectures are incorrectly remembered such as cities, wards, towns and villages, etc. located on boundaries of the urban and rural prefectures, the responsive voice stored to the ROM 17 is set to data for outputting the voice of a correct pronunciation of each of the names of the urban and rural prefectures with respect to any recognized voice and is also set to data for displaying a correct name of each of the urban and rural prefectures as display data. For example, as shown in FIG. 5, "Kawasaki city, Kanagawa prefecture" is set and stored as data stored to a column of the responsive voice even when "Kawasaki city, Tokyo Metropolis" is registered as an incorrect example of a recognizable voice. Further, data stored to the column of display data are set such that "Kawasaki city, Kanagawa prefecture" is displayed.

FIG. 5A further shows an application example of the present invention. This example shows a case in which "Kawasaki city, Kanagawa prefecture" is pronounced in Japanese, and a case in which "Kawasaki, Kanagawa" is pronounced in English. In these cases, separate character codes are respectively outputted in Japanese and English, but common longitude and latitude data are outputted.

In the case of this example, the latitude and longitude data for every place name are set to latitude and longitude data showing an absolute position of the seat of a government office (a city office, a ward office, a town office, a village office) in a region shown by its place name.

The longitude and latitude data and the character code data read from the ROM 17 for storing longitude and latitude converting data are supplied to output terminals 10a and 10b as outputs of the voice recognition apparatus 10. The obtained data of these output terminals 10a and 10b are supplied to the navigation apparatus 20. A talk switch 18 is arranged as an unlocked open-close switch (namely, a switch attaining a turning-on state only when the switch is pushed) in the voice recognition apparatus 10 in this example. While this talk switch 18 is pushed, the above processing is performed with respect to only an audio signal collected by the microphone 11 by circuits from the analog/digital converter 12 to a longitude latitude converting circuit 16.

The construction of the navigation apparatus 20 connected to the voice recognition apparatus 10 will next be explained. This navigation apparatus 20 has an antenna 21 for a GPS. A signal for a position measurement from a satellite for the GPS received by this antenna 21 is received and processed by a present position detecting circuit 22. The present position of the navigation apparatus is detected by analyzing the received data. Data of the detected present position are latitude and longitude data in an absolute position at this time.

The data of the detected present position are supplied to an arithmetic circuit 23. This arithmetic circuit 23 functions as a system controller for controlling the operation of the navigation apparatus 20. The arithmetic circuit 23 is connected to a CD-ROM driver 24, a RAM 25, a car speed sensor 26 and an operation key 27. In the CD-ROM driver 24, a CD-ROM (an optical disk) storing road map data thereto is set and the CD-ROM driver 24 reads stored data of this CD-ROM. The RAM 25 stores various kinds of data required for data processing. The car speed sensor 26 detects the movement of a vehicle mounting this navigation apparatus thereon. When longitude and latitude coordinate data in the present position, etc. are obtained, the arithmetic circuit 23 controls a reading operation for reading the road map data in the vicinity of its coordinate position to the CD-ROM driver 24. The arithmetic circuit 23 then makes the RAM 25 temporarily store the road map data read by the CD-ROM driver 24 and makes display data for displaying a road map by using these stored road map data. At this time, these display data are set to display data for displaying the map by a display scale (a reduced scale) set by an operation of the operation key 27 arranged in a predetermined position within the car, etc.

The display data made by the arithmetic circuit 23 are then supplied to a video signal generating circuit 28. A video signal of a predetermined format is generated by this video signal generating circuit 28 on the basis of the display data. This video signal is supplied to an output terminal 20c.

The video signal outputted from this output terminal 20c is then supplied to a displaying apparatus 40 and image receiving processing based on the video signal is performed by this displaying apparatus 40. Thus, the road map, etc. are displayed on a display panel of the displaying apparatus 40.

In addition to the display of such a road map in the vicinity of the present position, a road map, etc. in a position designated by the operation of the operation key 27, etc. can be set to be displayed on the basis of the control of the arithmetic circuit 23. Further, a specific coordinate position such as "destination", "starting spot", "routing spot", "one's own house", etc. can be set to be registered on the basis of the operation of the operation key 27, etc. When this specific coordinate position is registered, data (longitude and latitude data) in this registered coordinate position are stored to the RAM 25.

When the car speed sensor 26 detects running of the car, the arithmetic circuit 23 is set such that no operation except for a relatively simple operation within the operation of the operation key 27 is received.

This navigation apparatus 20 also has a self-contained navigation section 29. The navigation apparatus 20 calculates an exact running speed of the car on the basis of a pulse signal corresponding to a car speed and supplied to the computer for engine control, etc. on a car side. The navigation apparatus 20 also detects an advancing direction of the car on the basis of an output of a gyro sensor arranged within the self-contained navigation section 29. The navigation apparatus 20 then measures the present position of the car by the self-contained navigation from a position determined on the basis of the car speed and the advancing direction. For example, when the present position detecting circuit 22 attains a state unable to detect the car position, the car position is measured by the self-contained navigation from a car position finally detected by the present position detecting circuit 22.

A voice synthetic circuit 31 is also connected to the arithmetic circuit 23. When any designation using a voice is required in the arithmetic circuit 23, the voice synthetic circuit 31 executes synthetic processing of this designated voice and a voice is set to be outputted from the speaker 32 connected to the voice synthetic circuit 31. For example, various kinds of designations required for the navigation apparatus such as "Car approaches destination", "Advancing direction is left", etc. are given through voices. Further, in this voice synthetic circuit 31, a voice recognized by the voice recognition apparatus 10 is set to be synthesized on the basis of supplied character data and be outputted as a voice from the speaker 32. This voice synthetic processing will be described later.

Here, this navigation apparatus 20 has input terminals 20a and 20b. The longitude and latitude data and the data of a character code outputted from the output terminals 10a and 10b of the voice recognition apparatus 10 are supplied to the input terminals 20a and 20b. The longitude and latitude data and the character code data obtained at these input terminals 20a and 20b are supplied to the arithmetic circuit 23.

When these longitude and latitude data, etc. are supplied from the voice recognition apparatus 10, the arithmetic circuit 23 performs a reading control operation for reading road map data in the vicinity of the longitude and latitude from a disk by the CD-ROM driver 24. Then, the arithmetic circuit 23 makes the CD-ROM driver 24 temporarily store the read road map data to the RAM 25 and makes display data for displaying a road map by using these stored road map data. At this time, the display data are set to data displayed with the supplied longitude and latitude as a center.

A video signal is generated by the video signal generating circuit 28 on the basis of these display data. The displaying apparatus 40 displays a road map in a coordinate position designated from the voice recognition apparatus 10. When the road map in the coordinate position designated from this voice recognition apparatus 10 is displayed, the video signal for displaying the road map is set to a video signal for displaying a recognized place name by characters at a corner of the screen, etc. when the video signal for displaying the road map is generated by the video signal generating circuit 28. This display of the place name is erased when a predetermined time has passed (e.g., several tens of seconds have passed) since the place name was displayed (namely, since the video signal was outputted).

When the character code of a word for designating the operation of the navigation apparatus is supplied from the output terminal 10b of the voice recognition apparatus 10 and is discriminated by the arithmetic circuit 23, the arithmetic circuit 23 performs corresponding control. In this case, when this character code is the character code of a word for designating a display position such as "destination", "starting spot", "routing spot", "one's own house", etc., it is judged whether a coordinate in this display position is registered to the RAM 25 or not. Thereafter, when this coordinate is registered to the RAM 25, the CD-ROM driver 24 performs a reading control operation for reading road map data in the vicinity of this display position from a disk.

When data of a character code showing the pronunciation of a recognized voice are supplied from the voice recognition apparatus 10 to the arithmetic circuit 23, a word shown by this character code is synthetically processed by the voice synthetic circuit 31 and is outputted as a voice from the speaker 32 connected to the voice synthetic circuit 31. For example, when "Bunkyo ward, Tokyo Metropolis" is recognized as a voice on a side of the voice recognition apparatus 10, the voice synthetic circuit 31 performs synthetic processing for generating an audio signal for pronouncing "Bunkyo ward, Tokyo Metropolis" on the basis of data of a character series of this recognized pronunciation. This generated audio signal is outputted from the speaker 32.

In this case, when the voice is recognized by the voice recognition apparatus 10 in this example, longitude and latitude data are supplied to the terminal 20a of the navigation apparatus 20 approximately simultaneously when the data of a character code showing the pronunciation of the recognized voice are supplied to the terminal 20b. The arithmetic circuit 23 first executes processing for synthesizing a word recognized by the voice synthetic circuit 31 as a voice, and next executes processing for making the display data of a road map based on the longitude and latitude data.

An operation of the voice recognition apparatus, etc. will next be explained when a road map display, etc. are performed by using the voice recognition apparatus 10 and the navigation apparatus 20 in this example. The flow chart of FIG. 6 shows a voice recognizing operation performed by the voice recognition apparatus 10. In a step 101, it is first judged whether the talk switch 18 is turned on or not. When it is judged that this talk switch 18 is turned on, an audio signal collected by the microphone 11 for a period of this turning-on operation is sampled by the analog/digital converter 12 and is processed by the digital voice processing circuit 13 and is changed to vector data (step 102). Then, the voice recognition circuit 14 performs voice recognizing processing based on these vector data (step 103).

Here, it is judged in a step 104 whether the voice of a place name (namely, a place name registered in advance) stored to the ROM 15 for storing voice recognition data is recognized or not. When the voice of the registered place name is recognized, character data for pronouncing the recognized place name are read from the ROM 15 and are outputted from the output terminal 10b (step 105). Further, longitude and latitude data of the recognized place name are read from the ROM 17 for storing longitude and latitude converting data connected to the longitude latitude converting circuit 16 (step 106). Here, in the voice recognition of the place name, place names registered to the ROM 15 in this example are constructed by the names of domestic urban and rural prefectures, cities, wards, towns and villages. Accordingly, for example, a voice of "xx city, xx prefecture" and a voice of "xx ward, xx city" (here, the voice can be set to be recognized even when the names of urban and rural prefectures are omitted in the ward case) are recognized.

The longitude and latitude data read on the basis of the recognized voice and accompanying data thereof are outputted from the output terminal 10a (step 107).

When no voice of the registered place name can be recognized in the step 104, it is judged in a step 108 whether a specific registered voice except for the place name is recognized or not. Here, when the specific registered voice except for the place name is recognized, a character code corresponding to the recognized voice is judged (step 109) and is outputted from the output terminal 10b (step 110).

In contrast to this, when no specific registered voice except for the place name can be recognized in the step 108, processing at this time is terminated. Otherwise, disability of the voice recognition is transmitted to the navigation apparatus 20. The navigation apparatus 20 then gives warning by a synthetic voice in the voice synthetic circuit 31 or characters, etc. displayed in the displaying apparatus 40.

Figure 7:
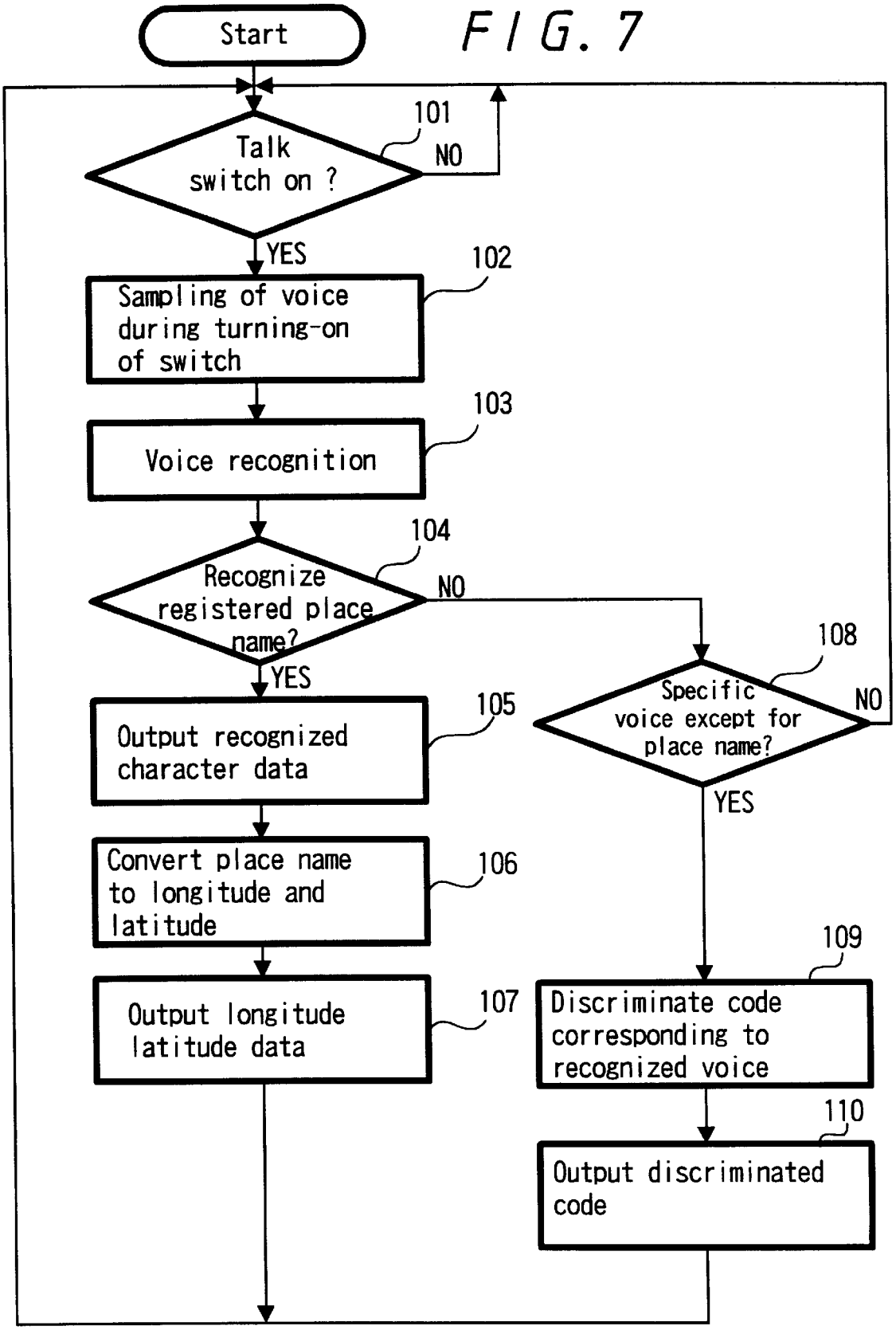
FIG. 7 is a flow chart showing display processing in a navigation apparatus in one embodiment.

Next, the flow chart of FIG. 7 shows the operation of the navigation apparatus 20. It is first judged in the arithmetic circuit 23 in a step 201 whether a display mode in the present position is set or not. When it is judged that the display mode in the present position is set, the present position detecting circuit 22 measures the present position (step 202). Road map data in the vicinity of the measured present position are read from the CD-ROM (step 203). Display processing of a road map based on these read road map data is performed and the road map in a corresponding coordinate position is displayed in the displaying apparatus 40 (step 204).

In contrast to this, when it is judged in the step 201 that no display mode in the present position is set, or, when the display processing of the road map in the present position in the step 204 is terminated and a displaying state of this road map is set, it is judged in a step 205 whether longitude and latitude data, etc. are supplied from the voice recognition apparatus 10 through the input terminals 20a and 20b. Here, when it is judged that the longitude and latitude data and accompanying character data thereof, etc. are supplied, a character code for a pronunciation supplied through the terminal 20b is first supplied to the voice synthetic circuit 31 and a voice recognized by the voice recognition apparatus 10 is synthesized and outputted from the speaker 32 (step 206). Subsequently, road map data in the vicinity of a position shown by the longitude and latitude data are read from the CD-ROM (step 207) and display processing of a road map based on these read road map data is performed. The road map in a corresponding coordinate position is then displayed in the displaying apparatus 40 (step 208).

When it is judged in the step 205 that no longitude and latitude data are supplied from the voice recognition apparatus 10, or when display processing of the road map of a designated place name in the step 208 is terminated and a displaying state of this road map is set, it is judged in a step 209 whether or not a character code for directly designating a display position is supplied from the voice recognition apparatus 10 through the input terminal 20b. When it is judged that the character code is supplied from the terminal 20b, this character code is supplied to the voice synthetic circuit 31 and a voice recognized by the voice recognition apparatus 10 is outputted from the speaker 32 (step 210). Next, when the character code (namely, words of "destination", "starting spot", "routing spot", "one's own house", etc.) for directly designating the display position is discriminated in the step 209, it is judged in a step 211 whether a coordinate position designated by these characters is registered to the RAM 25 or not. When this coordinate position is registered to the RAM 25, road map data in the vicinity of a position shown by the longitude and latitude data as the registered coordinate position are read from the CD-ROM (step 212). Then, display processing of a road map based on these read road map data is performed and a road map in the corresponding coordinate position is displayed in the displaying apparatus 40 (step 213) and it is returned to the step 201 in this displaying state.

When it is judged in the step 209 that no character code for directly designating the display position is supplied from the voice recognition apparatus 10, it is judged in the arithmetic circuit 23 in a step 214 whether or not there is an operation for designating the display position by operating the operation key 27. When there is an operation for designating this display position, it is judged in a step 215 from detected data of the car speed sensor 26 whether the vehicle is running at the present time or not. When the arithmetic circuit 23 judges that the vehicle is running, the operation at this time is invalidated and it is returned to the step 201 (a certain warning may be given at this time).

When it is judged that no vehicle is running, control goes from step 211. In the step 211, it is judged whether there is a registered coordinate or not. Thereafter, when there is a registered coordinate position, display processing of a road map in this position is performed in the steps 212, 213 and it is then returned to the step 201.

In contrast to this, when no coordinate in a corresponding position such as "destination", "starting spot", "routing spot", "one's own house", etc. is registered in the step 211, an unregister warning is given by a synthetic voice in the voice synthetic circuit 31 or display characters in the displaying apparatus 40 in a step 216 and it is then returned to the step 201.

Processing relative to the map display is explained with reference to the flow chart of FIG. 7. However, when a character code is supplied from the voice recognition apparatus 10 as a result of the recognition of a voice for designating an operation except for the map display, corresponding processing is performed on the basis of control of the arithmetic circuit 23. For example, when "what time now", etc. are recognized and a character code is supplied, a voice for pronouncing the present time is synthesized by the voice synthetic circuit 31 on the basis of the control of the arithmetic circuit 23 and is outputted from the speaker 32. The other commands are also processed such that a responsive voice is synthesized by the voice synthetic circuit 31 and is outputted from the speaker 32, or a corresponding display is performed by the displaying apparatus 40.

Figure 8:
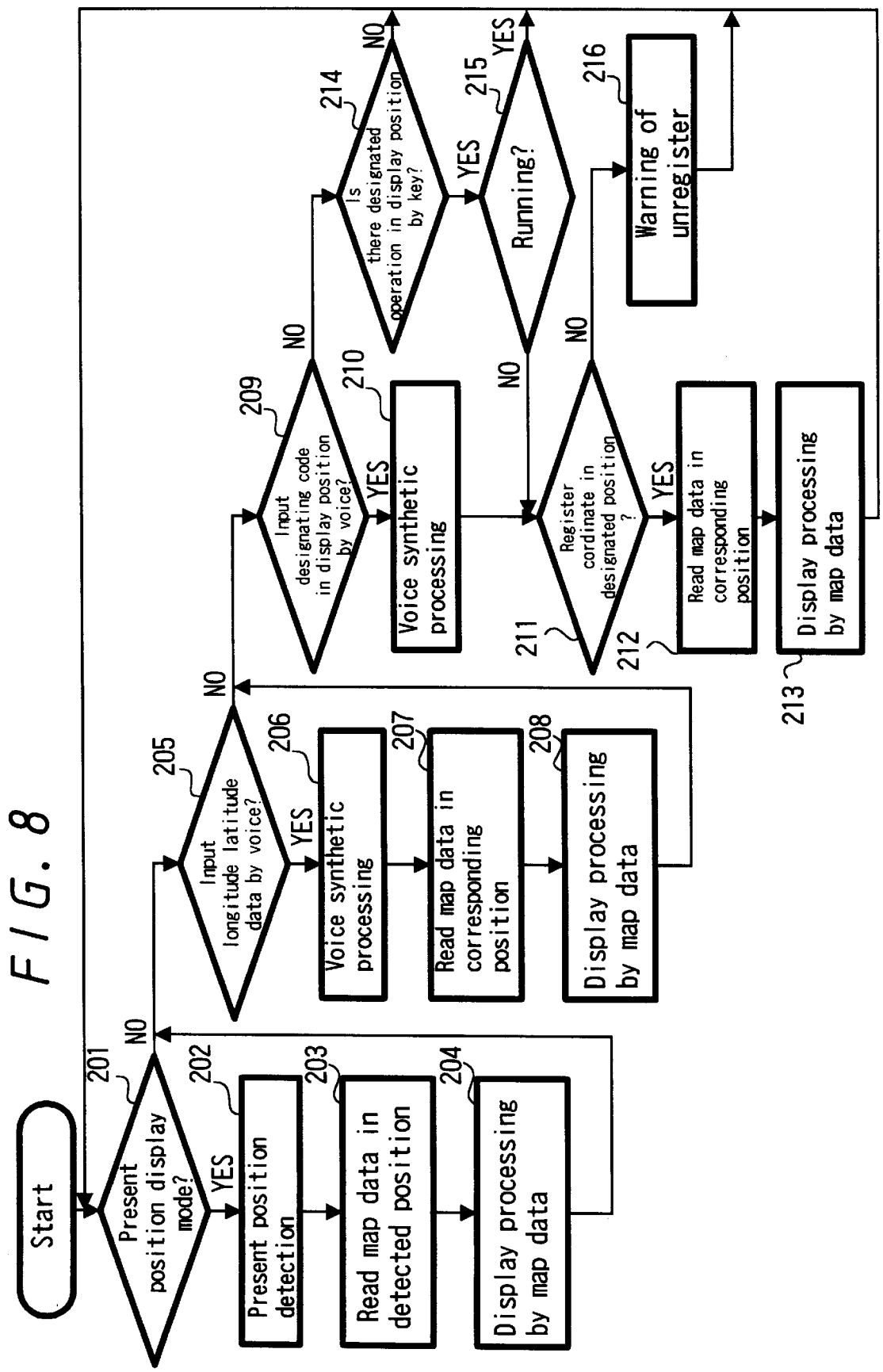
FIG. 8 is a flow chart showing processing from a voice input to a map display in one embodiment.
Figure 9:
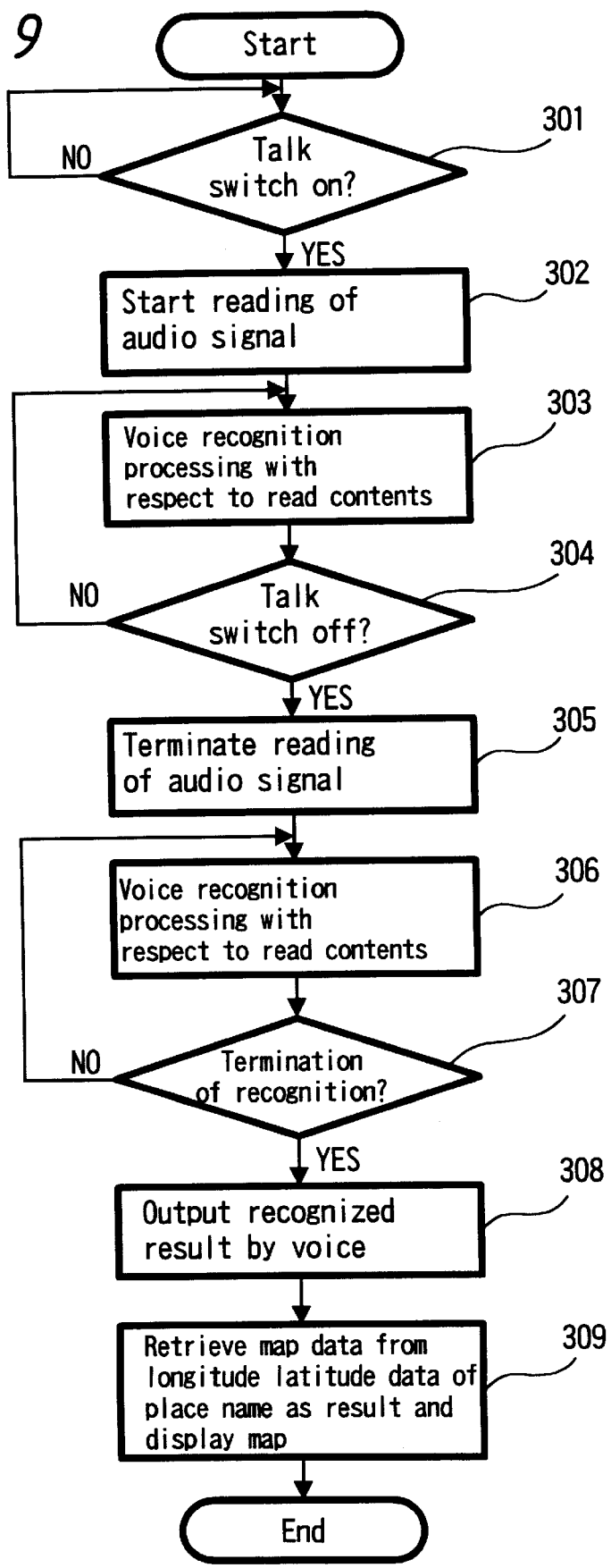
FIG. 9 is a flow chart showing processing of voice input via speech recognition to a map display in one embodiment.

Here, FIG. 8 shows processings in summary until a map is displayed on the basis of the voice recognition among the operations of the voice recognition apparatus 10 and the navigation apparatus 20 explained above.

It is first judged in a step 301 whether the talk switch 18 is turned on or not. When the talk switch 18 is turned on, a reading operation of an audio signal from the microphone 11 is started. The read audio signal is changed to digital data and is stored to a memory within the digital voice processing circuit 13 (step 302). The stored voice data are converted to vector data at any time and are recognized as a voice by the voice recognition circuit 14 (step 303). It is then judged in a step 304 whether the talk switch 18 is turned off or not. The voice recognizing processing is continuously performed until the talk switch 18 is turned off.

When the talk switch 18 is turned off, the reading operation of the audio signal from the microphone 11 is terminated in a step 305. The voice recognition processing with respect to the voice data read at this time point is continuously performed in a step 306. When it is judged in a step 307 that the voice recognizing processing is terminated, the character code of a voice as a recognized result is supplied to the navigation apparatus 20 and the voice as a recognized result is synthetically processed in the voice synthetic circuit 31 and is outputted from the speaker 32 in a step 308. When the recognized voice is a place name, road map data in the vicinity of a position shown by longitude and latitude data are read from the CD-ROM on the basis of data in a coordinate position of this place name. A video signal for displaying a road map based on these read road map data is generated in the video signal generating circuit 28. Thus, the road map in the vicinity of the corresponding coordinate position is displayed in the displaying apparatus 40 in a step 309.

A slight time (e.g., about 2 to 3 seconds) is required from the detection of the turning-off of the talk switch in the step 304 until the voice recognizing processing is terminated and the recognized result is outputted as a voice in the step 308. Further, a time of several seconds is required until a map in the corresponding position is displayed in the displaying apparatus 40 in the step 309.

Since the above display processing is performed, the display position can be freely set by a voice input in any place in the whole country and a road map in a desirable position can be simply displayed. Namely, the voice of an operator is simply recognized when the operator speaks "xx city, xx prefecture" and "xx ward, xx city" toward the microphone 11 while the operator pushes the talk switch 18. A road map in this region is also displayed. Accordingly, it is not necessary to designate a position by a key operation, etc. For example, the navigation apparatus can be operated even in a situation in which it is difficult to perform the key operation. In this case, the voice of a place name recognized by the voice recognition apparatus 10 in this example is limited to the names of domestic urban and rural prefectures, cities, wards, towns and villages so that the number of recognized voices is limited to a relatively small number (about 3500). Accordingly, the place name can be recognized by the voice recognition processing for a short time by a relatively small processing amount by the voice recognition circuit 14 within the voice recognition apparatus 10. Therefore, it is possible to shorten a time until a map designated in an inputted voice is displayed. Further, a recognition rate itself is also improved since the number of recognized place names is limited.

In this example, when the names of cities, wards, towns and villages are recognized as voices by the voice recognition apparatus 10, it is recognized as the same place name in both the pronouncing cases of "machi" and "son" and the pronouncing cases of "cho" and "mura" with respect to "town" and village". Accordingly, the place name itself can be correctly recognized even when the pronunciations of "town" and "village" are incorrect, thereby improving the recognition rate correspondingly. Further, the names of cities, wards, towns and villages tending to be mistaken with respect to the names of urban and rural prefectures can be also recognized correctly even when these names of the urban and rural prefectures are mistaken, thereby further improving the recognition rate.

When such a pronunciation is different from a correct pronunciation and an incorrect place name is recognized and its recognized result is outputted as a voice by the voice synthesis in the voice synthetic circuit 31, a correct voice read from the ROM 17 is outputted from the speaker 32 so that an operator knows the correct pronunciation and place name.

In the case of a word for designating the operation of the navigation apparatus, e.g., in the case of commands for hearing the present time, voices of commands for substantially hearing the same contents such as "present time", "time", etc. in addition to "what time now" are prepared as plural kinds of recognizable words. Accordingly, it is sufficient to designate the operation by a word used most easily for a user of the navigation apparatus. Therefore, the operation can be simply designated.

In the case of this example, data of a coordinate position corresponding to the place name stored to the ROM 17 within the voice recognition apparatus 10 are set to latitude and longitude data showing an absolute position in the seat of a government office (a city office, a ward office, a town office, a village office) in its region. Accordingly, a map with the government office as a center in its region is displayed so that a preferable display state is set. Namely, the government office in each region is located in a central portion of this region relatively in many cases. Accordingly, the possibility of a most preferable display form is high.

In the case of this example, a voice ("destination", "starting spot", "routing spot", "one's own house", etc.) for specifying a place except for the place name can be also recognized by the voice recognition apparatus 10. Accordingly, a display position can be directly set to a registered position by performing this designation through a voice. In this case, it is not necessary to judge coordinate data within the voice recognition apparatus 10 so that processing of the voice recognition apparatus 10 can be correspondingly performed rapidly.

In the above embodiment, place names recognized by the voice recognition apparatus are limited to the names of domestic urban and rural prefectures, cities, wards, towns and villages. However, more detailed place names may be recognized. In this case, when the number of recognizable place names is increased, a processing amount and a processing time required for the voice recognition are correspondingly increased. Therefore, it is most preferable to limit the number of recognizable place names to about the number of names of cities, wards, towns and villages so as to improve the recognition rate.

In the above embodiment, a central coordinate for every place name is set to latitude and longitude data showing an absolute position in the seat of a government office (a city office, a ward office, a town office, a village office) in its region, but may be set to latitude and longitude data showing another position. For example, the central coordinate may be simply set to latitude and longitude data of a center of its region (a city, a ward, a town, a village).

Further, data in the coordinate positions of end portions of east, west, south and north in its region may be stored instead of such central latitude and longitude data. In this case, it is sufficient if there are four sets of data of east and west longitudes and south and north latitudes.

In the above embodiment, a recognized voice is converted to a character code by the voice recognition apparatus 14 within the voice recognition apparatus, and this character code is converted to longitude and latitude data by the longitude latitude converting circuit 16. However, the recognized voice may be directly converted to longitude and latitude data. When no recognized voice is directly converted to the longitude and latitude data, the ROM 15 and the ROM 17 for storing these converted data may be constructed by the same memory such that, for example, the memory area of a place name is commonly used.

In the above embodiment, the present invention is applied to a navigation apparatus using a position measuring system called a GPS. However, the present invention can be also applied to a navigation apparatus using another position measuring system.

In accordance with the voice recognition apparatus of the present invention, it is possible to cope with a case in which there are plural voices with respect to the same control state in accordance with a difference in reading, etc. Accordingly, the possibility of correctly performing processing based on the voice recognition is increased.

In this case, when a voice with respect to a place name is recognized, a voice processing section can recognize both a voice provided in a correct reading way of this place name and a voice provided in an incorrect reading way. Accordingly, the correct voice can be recognized even when the voice is recognized in the incorrect reading way of the place name.

When the voice with respect to the place name is recognized in the voice processing section, it is possible to recognize both the correct voice of this place name and a voice having a mistaken possibility in reading. Accordingly, the mistaken place name (a place name not corresponding to an existing location) is also recognized and processing for coping with such a case can be performed.

Further, when a voice with respect to operating commands is recognized by the voice processing section, the same control data are outputted from a data output section by voice recognition of the operating commands substantially having the same contents. Accordingly, the operating commands can be given in voices in various speaking ways.

In the voice recognition method of the present invention, it is possible to cope with a case in which there are plural voices with respect to the same control state in accordance with a difference in reading, etc. Accordingly, the possibility of correctly performing processing based on the voice recognition is increased.

In the navigation apparatus of the present invention, it is possible to cope with a case in which there are plural voices with respect to the same control state in accordance with a difference in reading, etc. Accordingly, the possibility of correctly performing processing of a map display, etc. based on the voice recognition is increased.

In this case, when a voice with respect to a place name is recognized by the voice processing section, the voice processing section can recognize both a voice provided in a correct reading way of this place name and a voice provided in an incorrect reading way. Accordingly, the correct voice can be recognized even when the voice is recognized in the incorrect reading way of the place name.

When the voice with respect to the place name is recognized in the voice processing section, it is possible to recognize both the correct voice of this place name and a voice having a mistaken possibility in reading. Accordingly, the mistaken place name (a place name not corresponding to an existing location) is also recognized and processing for coping with such a case can be performed.

Further, when a voice with respect to operating commands is recognized by the voice processing section, the same control data are outputted from a data output section by voice recognition of the operating commands substantially having the same contents. Accordingly, the operating commands can be given in voices in various speaking ways.

In the navigation method of the present invention, it is possible to cope with a case in which there are plural voices with respect to the same control state in accordance with a difference in reading, etc. Accordingly, the possibility of correctly performing processing such as a map display, etc. based on the voice recognition is increased.

In the car of the present invention, when there are plural voices with respect to the same control state in accordance with a difference in reading, etc., designated processing is performed even when any voice is recognized.

Having described a preferred embodiments of the invention with reference to the accompanying drawings, it is to be understood that the invention is not limited to those precise embodiments and that various changed and modifications could be effected threin by one skilled in the art without departing from the spirit or scope of the invention as defined in the appended claims.

What is claimed is:

1. A voice recognition apparatus comprising:
   recognition means for recognizing a voice and providing output data, and
   data transforming means for transforming the output data of said recognition means to a predetermined form including memory means in which at least two input entries of said data transforming means result in getting identical output information wherein
   said output information is at least one of position information and a name of a geographical location and said at least two input entries are the name of said geographical location expressed by a first language and the name of said geographical location expressed by a second language.

2. A voice recognition method comprising the steps of:
   recognizing a voice and providing output data; and
   transforming the output data in said recognizing step to a predetermined form in which at least two items of input information in said transforming step result in getting identical output information, wherein
   said output information is at least one of position information and a name of a geographical location and said at least two items of input information in said transforming step are the name of said geographical location expressed by a first language and the name of said geographical location expressed by a second language.

3. A map displaying apparatus comprising:
   recognition means for recognizing a voice and providing output data,
   data transforming means for transforming the output data of said recognition means to a predetermined form in which at least two input entries of said data transforming means result in getting identical output information,
   display signal generating means for generating a map display signal from the output information from said data transforming means, and
   display means for displaying said map display signal provided by said display signal generating means, wherein
   said data transforming means includes memory means in which said at least two input entries of said memory means result in getting identical output information from said memory means and
   said output information is at least one of a position information and a name of a geographical location and
   wherein said at least two input entries are the name of said geographical location expressed by a first language and the name of said geographical location expressed by a second language.

4. The map displaying apparatus as claimed in claim 3, wherein
   said position information describes a position of a government office in a predetermined area.

5. The map displaying apparatus as claimed in claim 3, wherein
   said position information describes a central position of a predetermined area.

6. The map displaying apparatus as claimed in claim 3, wherein
   said position information describes an edge position of a predetermined area.

7. A map displaying method comprising the steps of:
   recognizing a voice and providing output data,
   transforming the output data in said recognizing step to a predetermined form in which at least two items of input information in said transforming step result in getting identical output information,
   generating a map display signal from an output signal in said transforming step, and
   displaying said map display signal provided by said generating step;
   wherein said output information is at least one of position information and a name of a geographical location and said at least two items of input information in said transforming step are the name of said geographical location expressed by a first language and the name of said geographical location expressed by a second language.

8. A navigation apparatus comprising:
   position detection means for detecting a present position,
   recognition means for recognizing a voice and providing output data,
   data transforming means for transforming the output data of said recognition means to a predetermined form in which at least two items of input information of said data transforming means result in getting identical output information,
   display signal generating means for generating a display signal from at least one of an output signal of said position detection means and an output signal of said data transforming means, and
   display means for displaying said display signal provided by said display signal generating means;

wherein said output information is at least one of position information and a name of a geographical location and said data transforming means including memory means in which said at least two items of input information of said memory means result in getting identical output information of said memory means.

9. A navigation apparatus comprising:

position detection means for detecting a present position, recognition means for recognizing a voice and providing output data, data transforming means for transforming the output data of said recognition means to a predetermined form in which at least two input entries of said data transforming means result in getting identical output information, map data storage means for storing map data, reading means for reading the map data stored in said map data storage means;

display signal generating means for generating a display signal from at least one of an output signal of said position detection means and an output signal of said data transforming means based upon the map data read from said map data storage means, and.

display means for displaying said display signal provided by said display signal generating means, wherein said data transforming means includes memory means in which said at least two input entries of said memory means result in getting identical output information of said memory means, and said output information is at least one of position information and a name of a geographical location, and wherein said at least two input entries are the name of said geographical location expressed by a first language and the name of said geographical location expressed by a second language.

10. The navigation apparatus as claimed in claim 9, wherein said position information describes a position of a government office in a predetermined area.

11. The navigation apparatus as claimed in claim 9, wherein said position information describes a central position of a predetermined area.

12. The navigation apparatus as claimed in claim 9, wherein said position information describes an edge position of a predetermined area.

13. A navigation method comprising the steps of:

reading map data from a map data storage means;

detecting a present position;

recognizing a voice and providing output data;

transforming the output data in said recognizing step to a predetermined form in which at least two items of input information in said data transforming step result in getting identical output information;

generating a display signal from at least one of an output signal in said data transforming step and an output signal in said reading step; and displaying said display signal provided by said display signal generating step;

wherein said output information is at least one of position information and a name of a geographical location and said at least two items of input information in said transforming step are the name of said geographical location expressed by a first language and the name of said geographical location expressed by a second language.

14. A car with a navigation apparatus comprising:

position detection means for detecting a present position of the car;

microphone means located inside said car;

recognition means for recognizing a voice gathered by said microphone means and providing output data;

data transforming means for transforming the output data of said recognition means to a predetermined form in which at least two items of input information of said data transforming means result in getting identical output information;

map data storage means for storing map data;

reading means for reading the map data stored in said map storing means;

display signal generating means for generating a display signal from at least one of an output signal of said position detection means and an output signal of said data transforming means based upon the map data read from said map data storage means; and display means located inside said car to display said display signal provided by said display signal generating means wherein said output information is at least one of position information and a name of a geographical location and said at least two items of input information in said transforming step are the name of said geographical location expressed by a first language and the name of said geographical location expressed by a second language.

* * * * *